United States Patent [19]
Donaldson

[11] Patent Number: 5,491,593
[45] Date of Patent: Feb. 13, 1996

[54] DISK DRIVE SPINDLE SYNCHRONIZATION APPARATUS AND METHOD

[75] Inventor: James E. Donaldson, Rochester, Minn.

[73] Assignee: International Business Machines Corporation, Armonk, N.Y.

[21] Appl. No.: 119,915

[22] Filed: Sep. 10, 1993

[51] Int. Cl.⁶ .................................................. G11B 15/46
[52] U.S. Cl. ................................... 360/73.03; 360/73.02
[58] Field of Search ....................... 360/73.021, 73.031, 360/69, 15, 71; 369/54

[56] References Cited

U.S. PATENT DOCUMENTS

| | | | |
|---|---|---|---|
| 3,503,058 | 3/1970 | Ault et al. | 340/174.1 |
| 4,236,050 | 11/1980 | Winslow et al. | |
| 4,618,897 | 10/1986 | Johnson et al. | 360/15 |
| 4,680,746 | 7/1987 | Senso | 369/50 |
| 4,870,643 | 9/1989 | Baltman et al. | 371/11.1 |
| 4,890,045 | 12/1989 | Ishizuka | 318/608 |
| 4,907,105 | 3/1990 | Kurzweil, Jr. | 360/73.02 |
| 4,918,544 | 4/1990 | Ishizuka et al. | 360/73.03 |
| 5,159,503 | 10/1992 | Mitamura et al. | 360/73.02 |
| 5,216,654 | 6/1993 | Itoh et al. | 369/54 |
| 5,237,466 | 8/1993 | Glaser et al. | 360/73.03 |
| 5,249,254 | 9/1993 | Murphy et al. | 388/907.5 |
| 5,303,097 | 4/1994 | Baba et al. | 360/73.02 |

FOREIGN PATENT DOCUMENTS

| | | |
|---|---|---|
| 0404120 | 12/1990 | European Pat. Off. . |
| 0426483 | 5/1991 | European Pat. Off. . |
| 0513741 | 11/1992 | European Pat. Off. . |
| 0522592 | 1/1993 | European Pat. Off. . |
| 0540355 | 5/1993 | European Pat. Off. . |

OTHER PUBLICATIONS

Patent Abstracts of Japan, vol. 17, No. 246, (P–1536), May 17, 1993, & JP4–366464.

*Primary Examiner*—W. R. Young
*Assistant Examiner*—Varsha A. Kapadia
*Attorney, Agent, or Firm*—Robert W. Lahtinen; Roy W. Truelson; Matthew J. Bussan

[57] ABSTRACT

A data storage disk drive array is synchronized using drives wherein each has an onboard oscillator assembly which is connected either for independent operation of each drive or synchronization of all or any selected drives of the array using a common or slave sync line that can supply an index signal to all or any portion of the drives of the array and is capable of using the oscillator assembly of any drive in the synchronized array as the source of the common precision index signal. The system can also be partitioned in subarrays with synchronization of the entire system, of individual subarrays or any mix of subarray combinations while retaining the capability for any drive of the system to function independent of the synchronization of any group of drives within the system.

1 Claim, 4 Drawing Sheets

DISK DRIVE SPINDLE SYNCHRONIZATION APPARATUS AND METHOD

BACKGROUND OF THE INVENTION

The present invention relates to disk data storage devices and more particularly to a system wherein multiple disk spindle assemblies are synchronously rotated with respect to one another to have the indices coincide or maintain a predetermined or programmable out-of-phase relationship.

A conventional disk drive ham a disk carrying spindle assembly that is closely speed regulated to maintain the rotational velocity of the disk media. The spindle motor is accelerated or decelerated in accordance with the phase error generated by the difference between a reference signal and rotational disk position feedback from the disk carrying spindle.

To obtain enhanced performance drives are commonly rotated j n synchronism with one another. Typical of such synchronized drives are multiple drives used in a synchronous array system where data is interleaved to enhance the data rate and performance or in systems where the latency delay is reduced by having two mirrored drives synchronized to rotate 180 degrees out of phase. The synchronism is best accomplished by using a single source of pulses to define the synchronizing index mark, If data is used from the disk surface of one drive within the system, an event that requires recovery by the primary drive also necessitates secondary recovery by the other drives prior to reestablishing the synchronized operation thereby compromising system performance. Another solution is to use an external oscillator to provide a common source of pulses that is decoded to produce a single precision index reference. Such s system is shown and described in U.S. Pat. No. 4,918,544 which uses a single crystal oscillator to supply the synchronization control circuits respectively associated with the drives within the system. Although this approach affords a control source that could avoid secondary recovery procedures when any drive in the system loses synchronized operation, it would require a separate clocking apparatus or two types of drive apparatus so that a system would use one unit including the clocking apparatus and other units without such structure.

SUMMARY OF THE INVENTION

In the structure taught by the present invention, each drive has a self contained local oscillator that either provides the index for the drive functioning as an independent unit or as a master for a plurality of like drive units which have synchronized spindle rotation. The oscillator pulse source of any of the like drives can be designated as the source of the index while the other drives within the system become slave units synchronized to the common source.

Within a synchronized system each of the individual index signal input lines are connected to a common line or node and each of the individual decoded oscillator circuits is connected to the common line or node through an enabling circuit that is controlled within the system to activate one and only one of the enabling circuits. This provides a single drive design that, within a plural drive system, not only uses a single index pulse source for synchronized operation and elimination of secondary recovery procedures, but also has the flexibility to use the clock pulse generating capability of any drive within the system as the master index pulse source.

The synchronized system disclosed is flexible in permitting any drive within the system function independently of the synchronized system. It is also shown how the drives of a system may be partitioned into subarrays, with the subarrays being either synchronized within the subarrays or combined for synchronization from a common index signal source. In this latter configuration it is also possible to exempt any drive or combination of drives from synchronization with a common index signal, whether a master index signal for the system or a localized index signal within the subarray.

Figure 1:
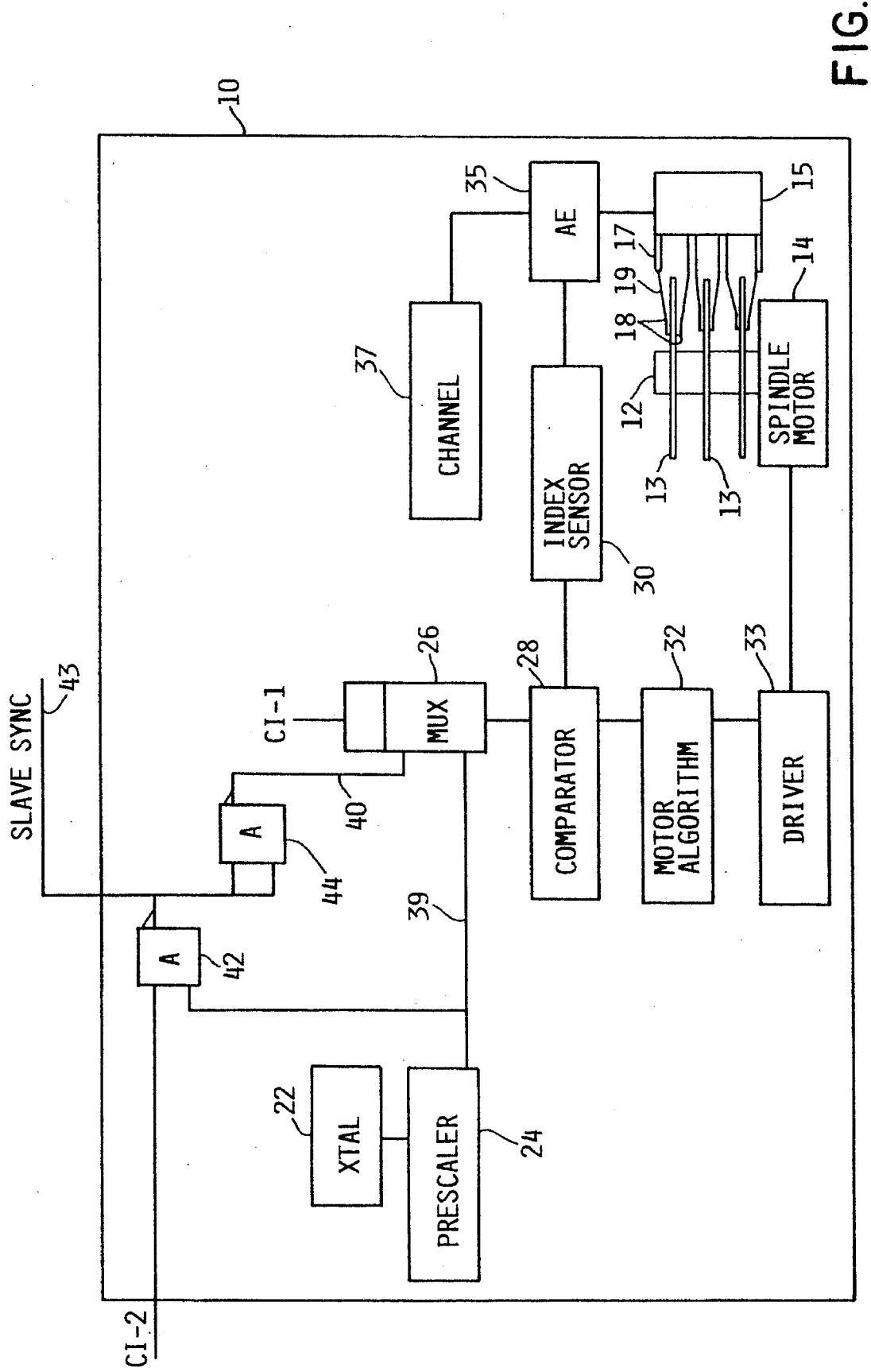
FIG. 1 is a block diagram illustrating the structure of a disk drive adapted for use in a drive array incorporating-the present invention.
Figure 2:
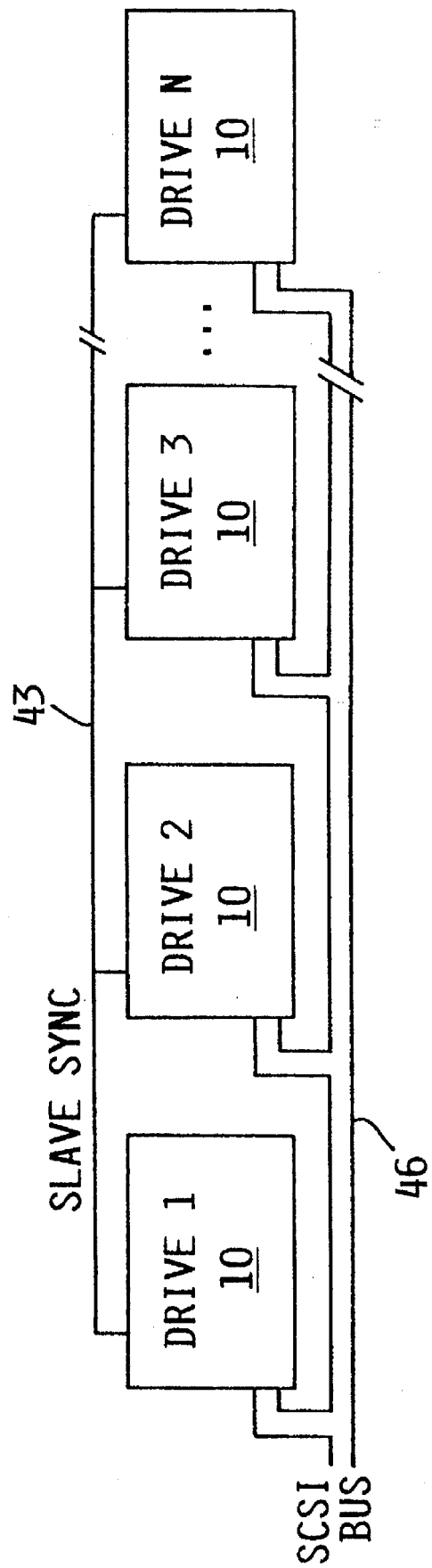

The block diagram of FIG. 2 shows an array of drives of FIG. 1 with control commands supplied by a SCSI bus.

Figure 3:
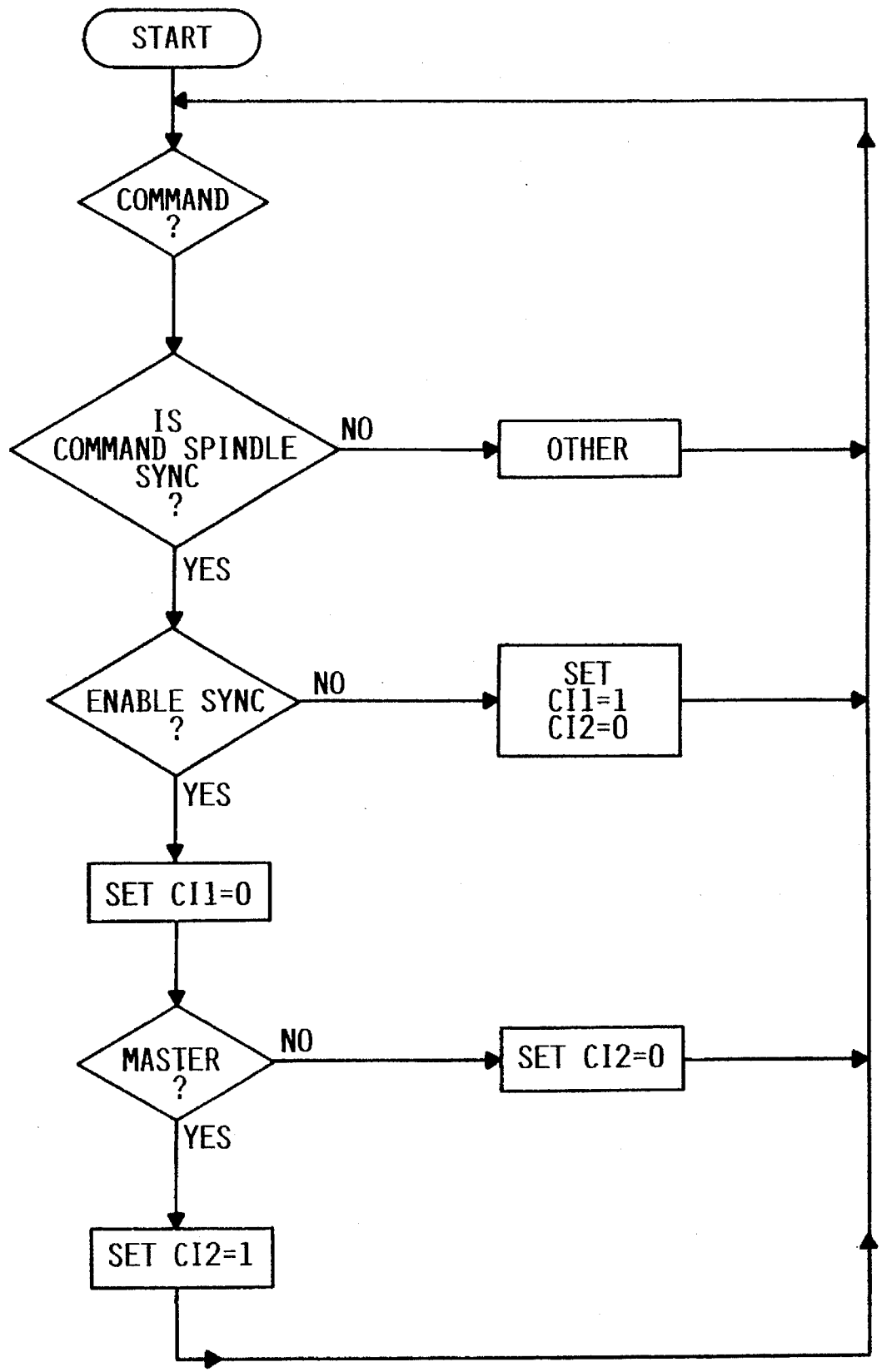

FIG. 3 is a flow chart of the functions invoked by a Spindle Sync command.

Figure 4:
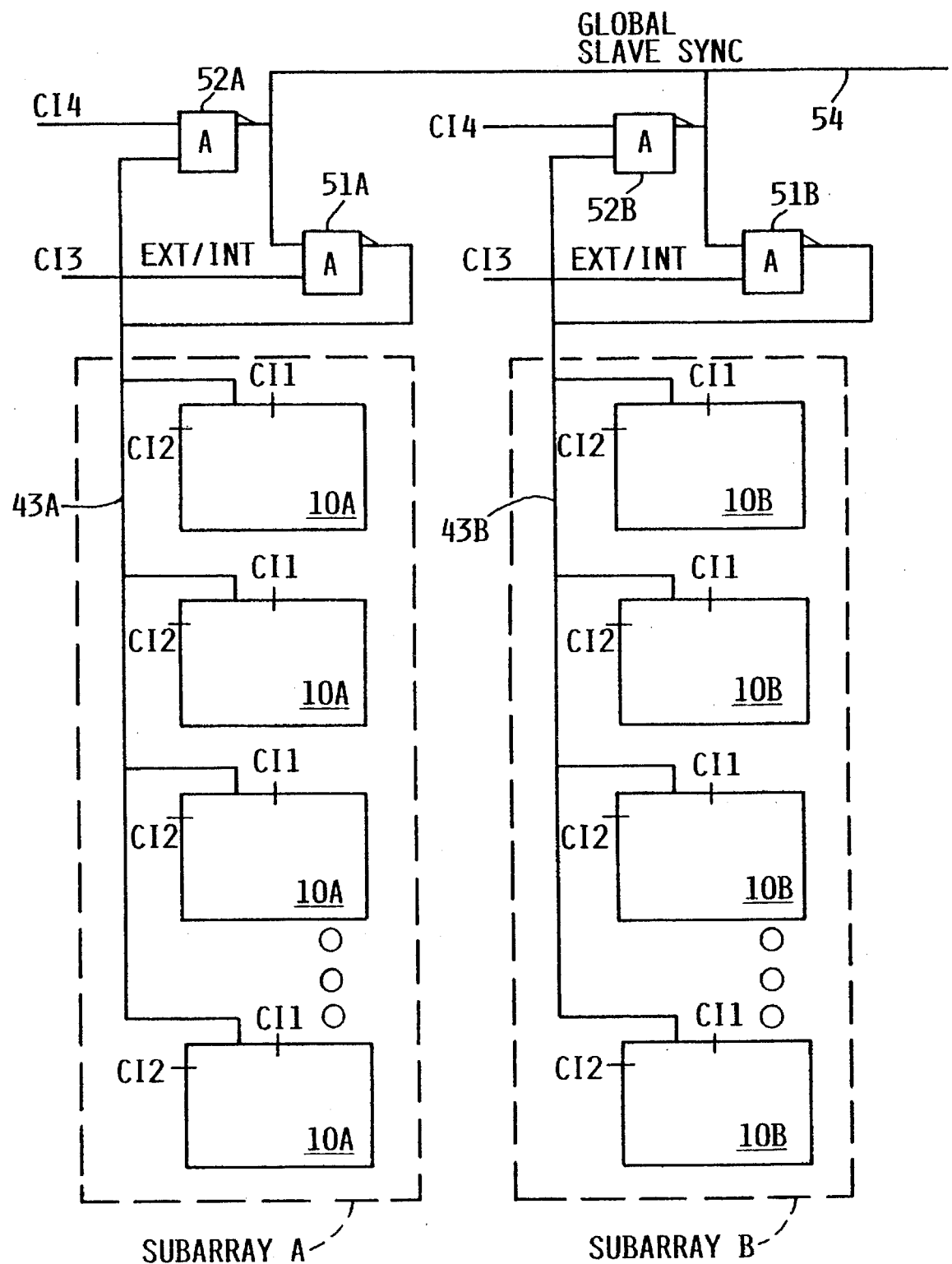

FIG. 4 is a second embodiment showing multiple drives, as illustrated in FIG. 1, which are partitioned into subarrays that may be synchronized to an index signal within the subarray or to an index signal common to the entire system.

DETAILED DESCRIPTION

A disk drive 10 used in the implementation of the present invention is shown in FIG. 1. A spindle 12 carries a plurality of disks 13 for rotation in unison with the rotor of the spindle motor 14. Concentric data tracks on the disks 13 are accessed by the actuator 15 which pivots arms 17 which carry transducer heads 18 mounted on suspensions 19. A local oscillator such as crystal 22 provides a pulse train which is reduced in frequency by a prescaler circuit 24 to provide a precision index signal which is transmitted through multiplexer 26 to comparator 28. Comparator 28 uses the precision index signal and an index signal derived by an index sensor 30 to generate an error value that is supplied to the motor algorithm circuitry 32 to regulate or control the driver circuit 33 and maintain the spindle motor speed at a closely regulated rotational velocity.

The arm electronics 35 processes and discriminates between signals being written to or read from the disk surfaces. User data is transmitted to and from the channel circuits 37 and other data, such as servo information and index signals, are identified and transmitted to device control circuits. The servo information may be derived from a dedicated servo wherein continuous servo information is obtained using a servo head which reads continuous servo information on a dedicated surface portion of a disk or from a sector or embedded servo wherein servo data is interspersed with user data using a servo sector portion associated, with each data sector or a series of peripherally arranged servo sectors within the user data. The sensed index mark identified by the index sensor 30 is transmitted to comparator 28 for evaluation with respect to the precision index signal.

The drive 10 may be operated as a single independent disk storage device or may be synchronized with any number of other like drives. For operation as an independent disk storage device, the control input CI1 to multiplexer 26 is set to a value of one which selects line 39 and deselects line 40 to enable the output of prescaler 24 to be directly connected to comparator 28. To be synchronized with other similarly configured drives, the control input CI1 is set to a value of zero which selects line 40 and deselects line 39. The control input C12 is thereupon used to gate the output of the oscillator assembly to the common or slave sync line 43 if the drive is selected as the master or isolate the oscillator output from line 43 if the drive is one of the slave devices of the array.

If the control input C12 is active, each pulse from prescaler 24 is gated by NAND 42 to the common or slave sync line 43 and controls the synchronization of the local drive by application of the signal through NAND 44 (which functions as an inverter) to the multiplexer 26 and comparator 28. If the control input C12 is down or inactive, the local oscillator assembly is isolated and the precision index signal on common or slave sync line 43, originating from another disk drive unit is communicated through NAND 44 to multiplexer 26 and comparator 28.

FIG. 2 shows an array of drives 10, each connected to a SCSI bus 46 and all having tile slave sync lines 43 commonly connected. As illustrated by FIG. 3, the commands received on the SCSI bus are monitored until a Spindle Sync command is identified. Thereupon control input CI1 is set to zero to deactivate the direct connection from the local oscillator assembly. Each drive then determines whether it has been designated as the master or as a slave unit within the array and sets the control input C12 to one or zero respectively. If other than one master is designated, an error condition occurs.

The array, as configured and connected, synchronizes spindle rotation to the precision index signal of the selected master oscillator assembly. In the event of a problem associated with the master oscillator assembly, the oscillator assembly of another drive unit within the array assembly is designated as the master. As so configured, it is not necessary to resync all units of the array if the master drive loses sync as is necessary where the master unit obtains the controlling index signal from the data on the disk surface. If a separate oscillator device is used, the signal will not be lost to other units of the array when a single drive loses sync, but it is necessary to have a separate oscillator assembly part and the flexibility of switching to another readily available oscillator assembly is lost.

FIG. 4 illustrates a second embodiment wherein subarrays A and B may be synchronized within themselves or may be synchronized to a common index signal throughout the entire system. The illustration of FIG. 4 shows two subarrays, however the system can be partitioned into any number of subarrays with each subarray including any number of disk drives. Each of the disk drive units 10A and 10B are identical to the disk drive unit 10 of FIG. 1 and each drive 10A is connected to a slave sync line 43A while each drive 10B j s connected to a slave sync line 43B. Each of the drives 10A and 10B has a control input CI1 which determines whether the respective drive uses the index signal on the associates slave sync line 43A or 43B or uses the index signal generated by its own local oscillator assembly. The control input CI2 is used to select the local oscillator assembly that is to be source of the index signal for the subarray or the entire system. When the entire drive system is synchronized from a common index signal, only one of the CI2 control inputs is active. If the global slave sync signal on line 54 originates from subarray A, the control input CI4 connected to NAND 52A is set at a one level to communicate the index signal on line 43A, to line 54 and the control inputs CI4 associated with all other subarrays within the system are set to zero. The control input CI3 associated with subarray A is set to zero. The control remaining inputs CI3 are set to one or zero to respectively have the global slave sync signal on line 54 control the associated subarray or have the subarray use the index signal on the internal slave sync line 43. Thus any combination of subarrays may be synchronized to a common index signal or may use an index signal gene:rated within the subarray. Further, any drive within the system may use its own independently generated index signal and be excluded from the synchronized control of either the global sync signal or the slave sync signal of the associated subarray.

Although the invention has been described in detail with reference to its presently preferred embodiments, it will be understood by one of ordinary skill in the art that various modifications can be made without departing from the spirit and scope of the invention. Accordingly, it is not intended that the invention be limited, except as by the appended claims.

What is claimed is:

1. A synchronizing control system for an array of disk drive data storage devices comprising an array of disk drives;

said array of disk drives being partitioned into a plurality of subarrays with each subarray including multiple drives;

each said disk drive including a plurality of data storage disks mounted on a spindle for rotation in unison with the rotor of a spindle motor, an oscillator assembly that provides a precision index signal, spindle motor control circuit means for controlling the rotational velocity of said spindle motor, synchronizing circuit means for enabling synchronous operation with other of said disk drives, first switch means for interconnecting said precision index signal to said spindle motor control circuit mean, directly when in one state or through said synchronizing circuit means when in another state, said synchronizing circuit means including second switch means which is activated to select the oscillator assembly of that drive as the source of the precision index signal for other disk drives during synchronous operation;

means connecting the synchronizing circuit means of each disk drive within an array to a common subarray line;

third switch means, associated respectively with each subarray for connecting the common line of the associated subarray to a global common line;

means for connecting one and only one of said oscillator assemblies to said global common line; and fourth switch means associated respectively with each subarray to selectively connect the subarray common line to said global common line, whereby the subarray can either operate in synchronization with the index signal supplied by said global common line or in synchronization with an index signal generated within said subarray.

* * * * *